United States Patent
Olson et al.

(10) Patent No.: US 9,417,093 B2
(45) Date of Patent: *Aug. 16, 2016

(54) AMR TRANSMITTER AND METHOD USING MULTIPLE RADIO MESSAGES

(71) Applicant: Badger Meter, Inc., Milwaukee, WI (US)

(72) Inventors: John A. Olson, Brookfield, WI (US); Ronald D. Benson, Colgate, WI (US)

(73) Assignee: Badger Meter, Inc., Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/531,509

(22) Filed: Nov. 3, 2014

(65) Prior Publication Data
US 2015/0070189 A1    Mar. 12, 2015

Related U.S. Application Data

(63) Continuation of application No. 12/489,590, filed on Jun. 23, 2009, now Pat. No. 8,878,690.

(51) Int. Cl.
| | |
|---|---|
| *G08B 23/00* | (2006.01) |
| *G08C 15/06* | (2006.01) |
| *G08B 21/00* | (2006.01) |
| *G01D 4/00* | (2006.01) |

(52) U.S. Cl.
CPC .............. *G01D 4/004* (2013.01); *G01D 4/006* (2013.01); *Y02B 90/242* (2013.01); *Y02B 90/243* (2013.01); *Y04S 20/322* (2013.01); *Y04S 20/325* (2013.01)

(58) Field of Classification Search
CPC ...... G01F 15/06; G01D 4/004; Y02B 90/243; Y02B 90/242
USPC ..................................................... 340/870.02
See application file for complete search history.

(56) References Cited

U.S. PATENT DOCUMENTS

| | | | |
|---|---|---|---|
| 3,935,735 A | 2/1976 | Lee | |
| 4,052,896 A | 10/1977 | Lee et al. | |
| 4,633,719 A | 1/1987 | Vander Heyden | |
| 4,838,127 A | 6/1989 | Herremans et al. | |
| 5,594,181 A | 1/1997 | Stange | |
| 5,719,329 A | 2/1998 | Jepson et al. | |
| 6,539,819 B1* | 4/2003 | Dreyer | G01D 11/24 73/431 |
| 6,710,721 B1* | 3/2004 | Holowick | G01D 4/006 340/870.02 |
| 8,109,131 B2* | 2/2012 | Winter | G01D 4/006 73/40.5 R |
| 8,878,690 B2* | 11/2014 | Olson | G01D 4/004 340/870.02 |
| 2008/0150750 A1* | 6/2008 | Parris | G01D 4/002 340/870.02 |
| 2008/0290986 A1* | 11/2008 | Laughlin-Parker | G05B 9/02 340/3.8 |

FOREIGN PATENT DOCUMENTS

| | | |
|---|---|---|
| JP | 2005189090 A | 7/2005 |
| WO | 2007/020375 A1 | 2/2007 |

* cited by examiner

*Primary Examiner* — Firmin Backer
*Assistant Examiner* — Jerold Murphy
(74) *Attorney, Agent, or Firm* — Boyle Fredrickson, S.C.

(57) ABSTRACT

The invention provides a method and several types of devices for converting meter reading signals into data messages including a first message (40) having meter data (44) representing consumption of a utility, and meter diagnostic status data (43), and a second message (60) having meter reverse flow data (63-65) and meter diagnostic data (66) particular to an electronic flow meter, and receiving, said first message (40) and said second message (60) and converting first message and said second message to radio frequency signals (25) and transmitting said radio frequency signals (25) to a receiver (22, 24).

18 Claims, 8 Drawing Sheets

| 47 | 48 | 49 | 57 | 58 | 59 |
|---|---|---|---|---|---|
| TAMPER (1) | ALARM (1) | LEAK (1) | REVERSE FLOW (1) | STUCK METER (1) | METER TYPE (3) |

DECODED STATUS BYTES (43)

AMR TRANSMITTER AND METHOD USING MULTIPLE RADIO MESSAGES

CROSS-REFERENCE TO RELATED APPLICATION

This application is a continuation, and claims the benefit of U.S. application Ser. No. 12/489,530, filed Jun. 23, 2009, the entirety of which is hereby incorporated by reference.

TECHNICAL FIELD

The present invention relates to automatic meter reading (AMR) systems that include an electronic meter or meter register and a network for collecting utility metering data.

DESCRIPTION OF THE BACKGROUND ART

Recently, electronic meter registers have begun to appear in utility metering applications. An example of a separate electronic meter register is disclosed in Olson, U.S. Pat. No. 6,611,769. An example of an electronic meter register integrated in one housing with a mechanical meter is disclosed in Lazar et al., U.S. Pat. No. 7,412,882.

Traditionally, ultrasonic and acoustic type meters have been used for measuring industrial and wastewater flows. Examples of such meters are disclosed in Lee, U.S. Pat. No. 3,935,735; Lee. et al., U.S. Pat. No. 4,052,896 and Vander Heyden et al., U.S. Pat. No. 4,633,713. Such meters depend on signals impinging upon particles in the flow stream, Doppler methods and time-of-travel characteristics to measure the flow. European Patent Publication 1493998A2, published Jun. 8, 2004, discloses an ultrasonic flow meter for utility usage.

The use of some types of electronic meters, such as ultrasonic types, fluidic oscillatory types and electromagnetic sensing meters, has been limited due to elements of cost. With advance in the design and construction of these devices, it may now be possible to meet marketplace pricing constraints.

Electronic meters have not previously been in widespread use in utility applications in the United States due to cost factors. As raw material costs and manufacturing costs are rapidly increasing at this time, there is a now a cost advantage to converting mechanical-based metering systems to electronic metering systems. Also, electronic meters are well-suited for use in AMR systems. Electronic meters provide greater accuracy than some other types of known utility meters. And, electronic meters are well adapted to flows with particles included.

Electronic meters and meter registers may be able to handle certain data that is particular to electronic meters such reverse flow data, empty pipe data and end-of-life data. This, however, requires improvements in network communication protocols to handle the additional data.

SUMMARY OF THE INVENTION

In one aspect, the invention relates to a method and circuitry for communicating metering data in a pair of related messages to a receiver. The first of two messages includes a transmitter ID number, utility consumption data, and diagnostic, data for conventional conditions such as, for example, a tamper indication, a leakage indication, and a stuck meter indication. A second message is provided to add reverse flow data and diagnostic data, particular to an electronic meter, such as an empty pipe indication, and an end of life indication.

In a further aspect of the invention, status data are added to the first message to indicate the presence of reverse flow data and diagnostic data, such as empty pipe, low temperature and end-of-life in the second message.

In a further aspect of this invention, the second message can be transmitted less frequently than the first message by an order of magnitude, or the interval can be extended for the purpose of conserving the life of one or more batteries.

The invention also provides diagnostic data and profiling data for reverse flow conditions over the last seven days and the last twenty-four (24) hours.

The invention is provided in three physical embodiments, one embodiment which fully integrates a meter, a meter register and a radio transmitter in one housing, and two other embodiments in which meter data is output through a data port from the meter register to a separate transmitter assembly, which can be mounted to a pit lid.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
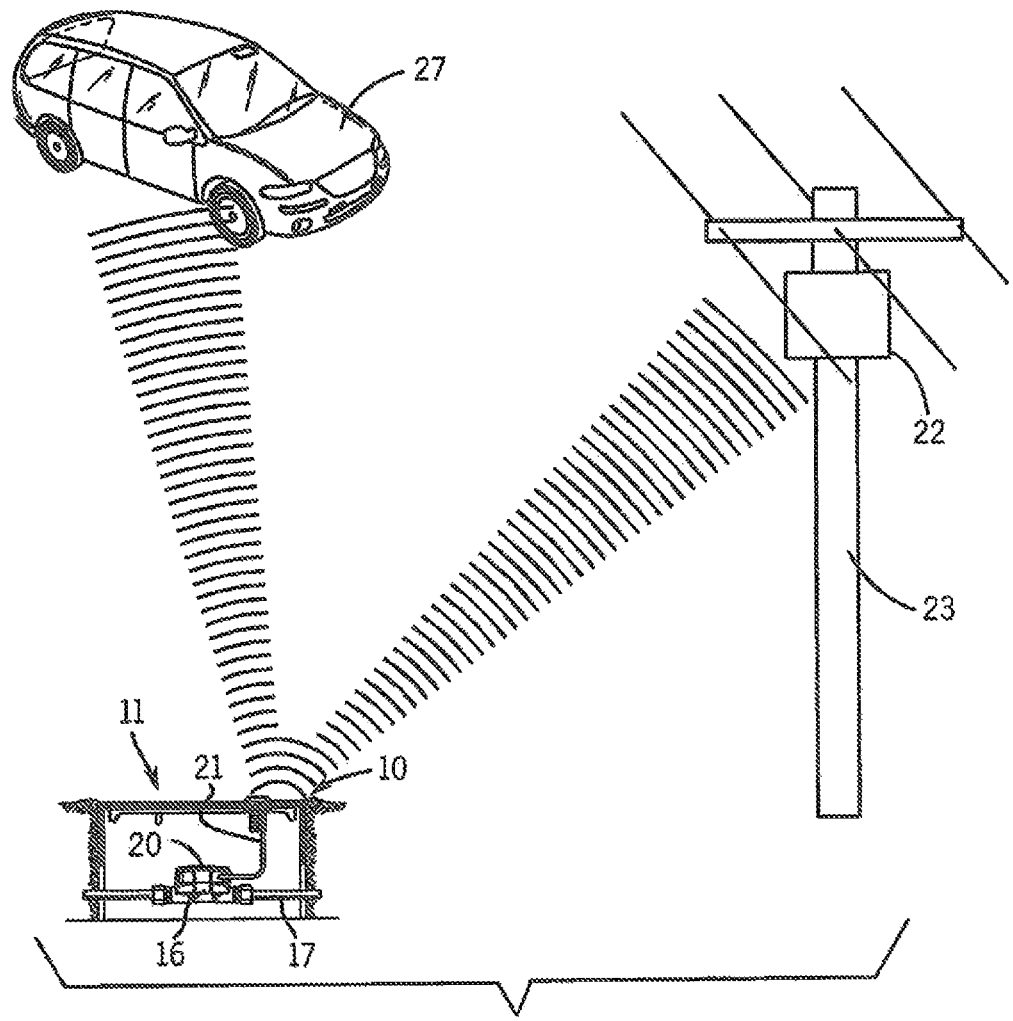
FIG. 1 is a perspective view of an AMR system, illustrating a mobile receiver in a drive-by vehicle and a fixed receiver for receiving transmissions from a transmitter associated with a utility meter.
Figure 2:
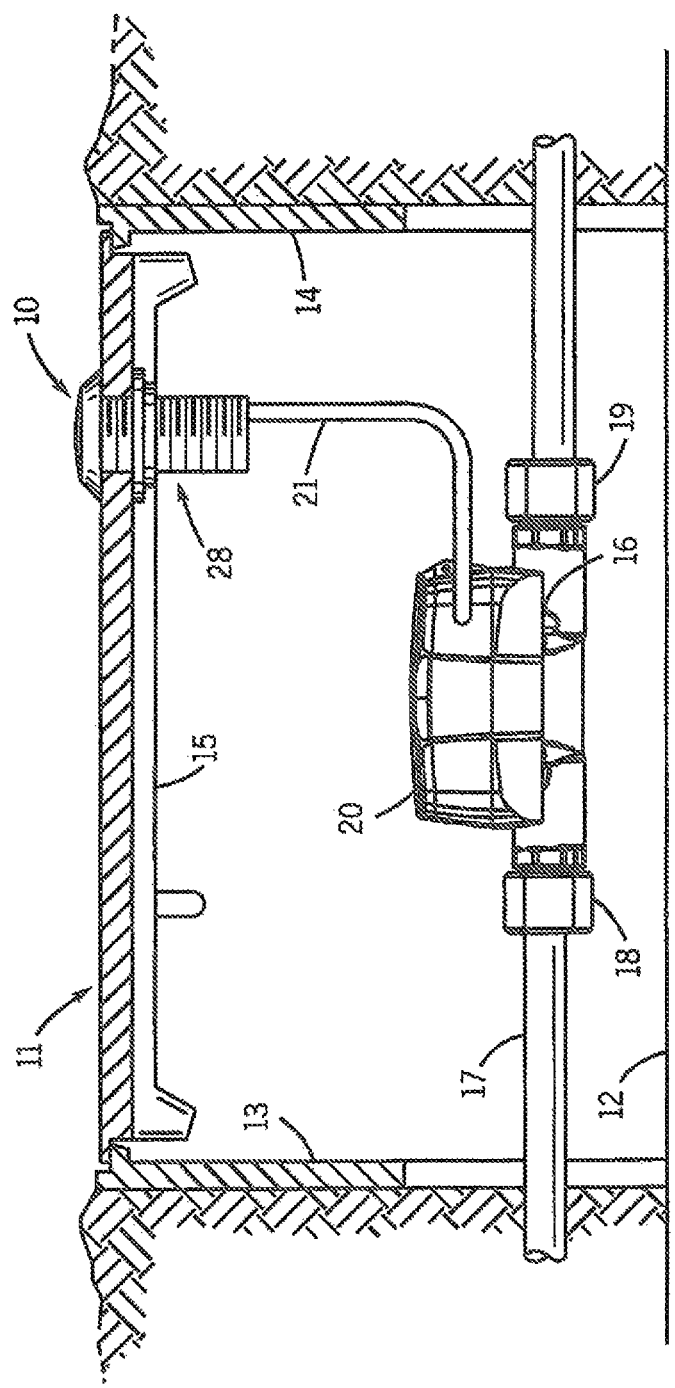
FIG. 2 is a side view in elevation of a meter assembly and a separate transmitter assembly installed in a subsurface pit enclosure.

Referring to FIGS. 1 and 2, in this example, the invention is incorporated in a water meter assembly 16, 20, and a radio transmitter assembly 10 disposed in a subsurface pit enclosure 11 and connected by a cable 21. The pit enclosure 11 is typically made of metal, concrete, plastic or other materials with a lid 15 which is removable to open the enclosure 11 for access. The pit enclosure 11 is located along the route of water supply pipe 17. The housing assembly 16, 20 includes a lower, tubular housing 16 for housing the water metering elements and for withstanding water pressure, which is connected in the water supply line 17 by coupling nuts 18 and 19 (FIG. 2). An upper housing 20 for a water meter register, and in some other embodiments, a transmitter, is positioned on top of the lower housing 16. This upper housing 20 is preferably made of plastic, such as polystryrene, ASA Luran or an equivalent non-metallic material. A visual display of a types known in the art would be seen from the top of the upper housing 20. In recent years, the meter register has included a transducer for converting: i) mechanical movements, ii) movements of a magnet or iii) electrical meter signals to electrical signals of a type known in the art for signaling units of consumption of a utility.

Figure 4:
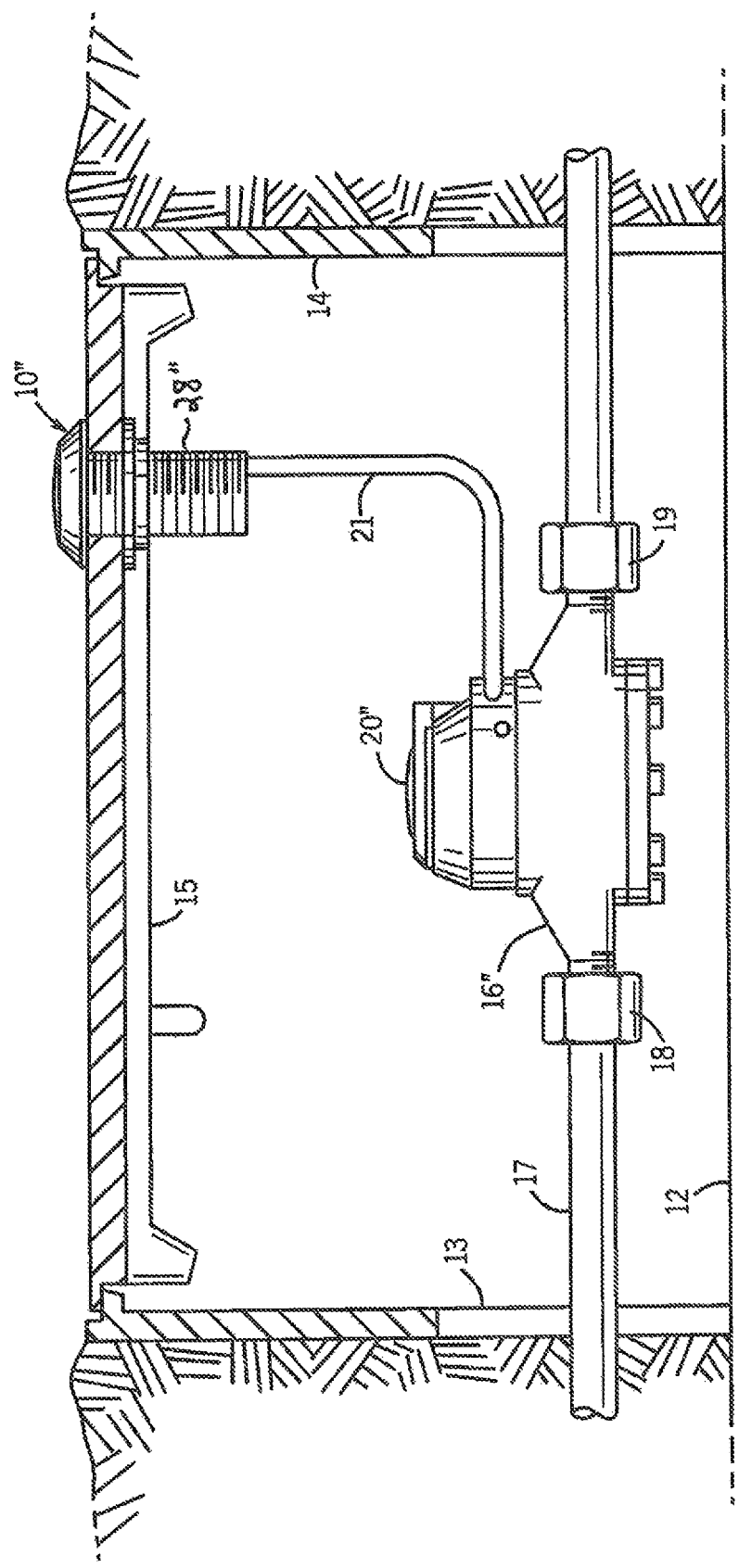
FIG. 4 is a side view in elevation of a conventional water meter with a meter register and a transmitter assembly of the present, invention installed in a subsurface pit enclosure.

As further seen in FIGS. 2 and 4, in a "remote version" of the present, invention, a shielded cable 21 connects the electronics in the meter register housing 20, 20" to a transmitter assembly 10, 10", which is housed in a tubular transmitter housing 28, 28", preferably of a plastic material, such as polystryrene, ASA Luran or an equivalent non-metallic material. The transmitter housing 28, 28" hangs down from the pit lid 15 and includes its own battery, as is known in the art. The transducer electronics in the meter register housing 20, 20" transmits electrical signals representing units of consumption of a utility to the transmitter assembly 10, 10", which incorporates meter data and other data in messages encoded for transmission through a radio network.

FIG. 2 provides a version in which the meter and meter-register are integrated, but where the transmitter assembly 10 is contained in a separate housing. FIG. 4 represents the traditional configuration of a separate meter register 20" mounted on a water meter housing 16" with a separate transmitter assembly 10".

Figure 3:
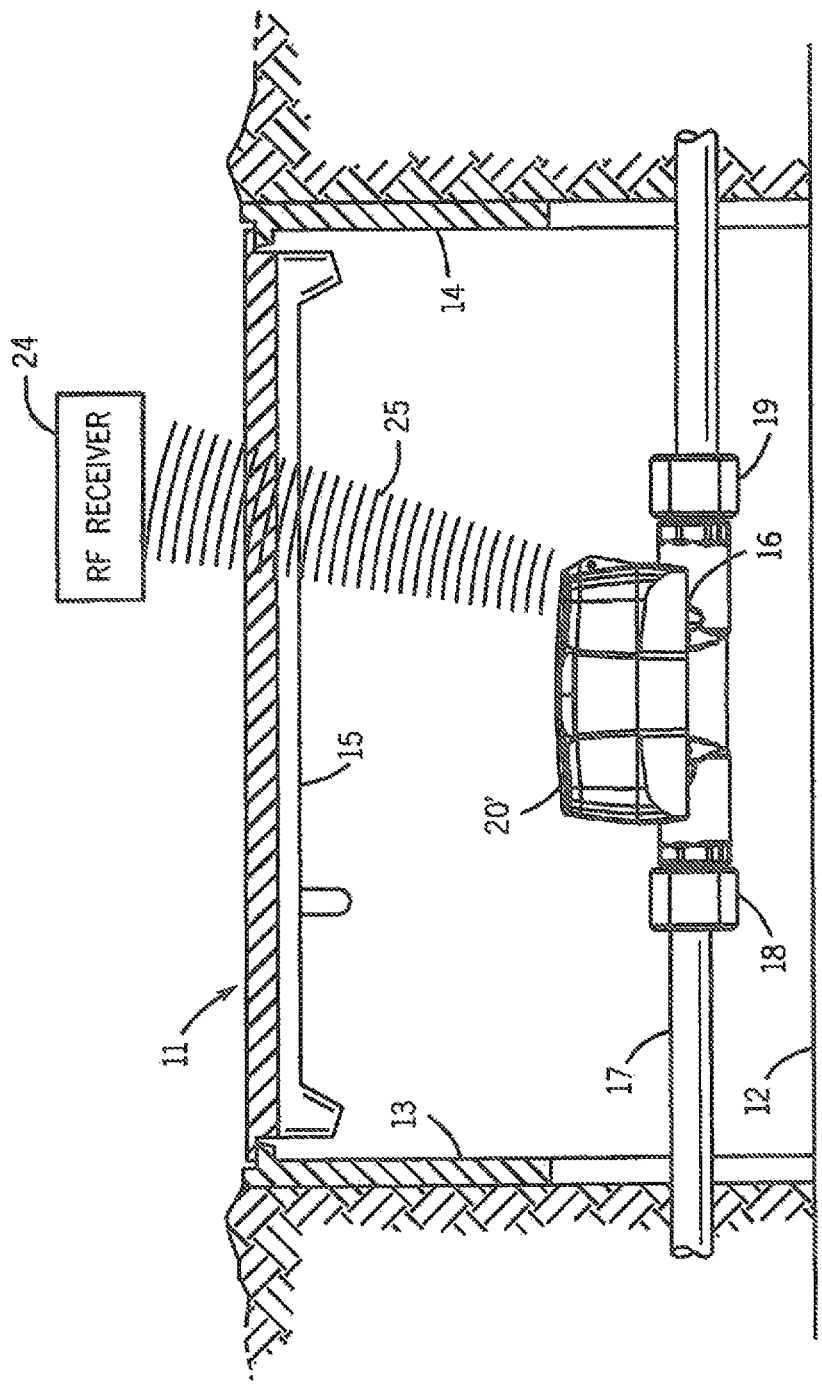
FIG. 3 is a side view in elevation of an integrated meter, meter transducer and transmitter assembly installed in a subsurface pit enclosure.

In a fully "integrated version" of the invention seen in FIG. 3, a housing 20' encloses both meter register and transmitter formed on a circuit board 26 and an antenna 29 for transmitting signals directly through the pit lid 15 to a radio signal receiver 24. In this version, the pit lid 15 is made of a non-RF-interference material, for example, plastic, concrete or other materials that will not significantly change the direction of, or attenuate, RF signals.

The transmitter assemblies 10, 10", 26 communicate via RF signals with a receiver 24 which can be a mobile receiver in a vehicle 27 seen in FIG. 1. The transmitter assemblies 10, 10" 26 each transmit radio frequency signals encoded with messages and meter data, as will be further described below in relation to FIGS. 8-11. The meter data is collected from various customer locations and transmitted to a central office for processing for billing purposes.

In the present invention, the transmitter assemblies 10, 10", 26 also communicate, via RF signals with a fixed receiver 22 installed on a utility pole 23 seen in FIG. 1, within a range of up to one thousand feet of the transmitter unit 10. The transmitter assembly 10, 10", 26 transmits electronic messages, including meter data, as will be further described below in relation to FIGS. 8-11.

Figure 5:
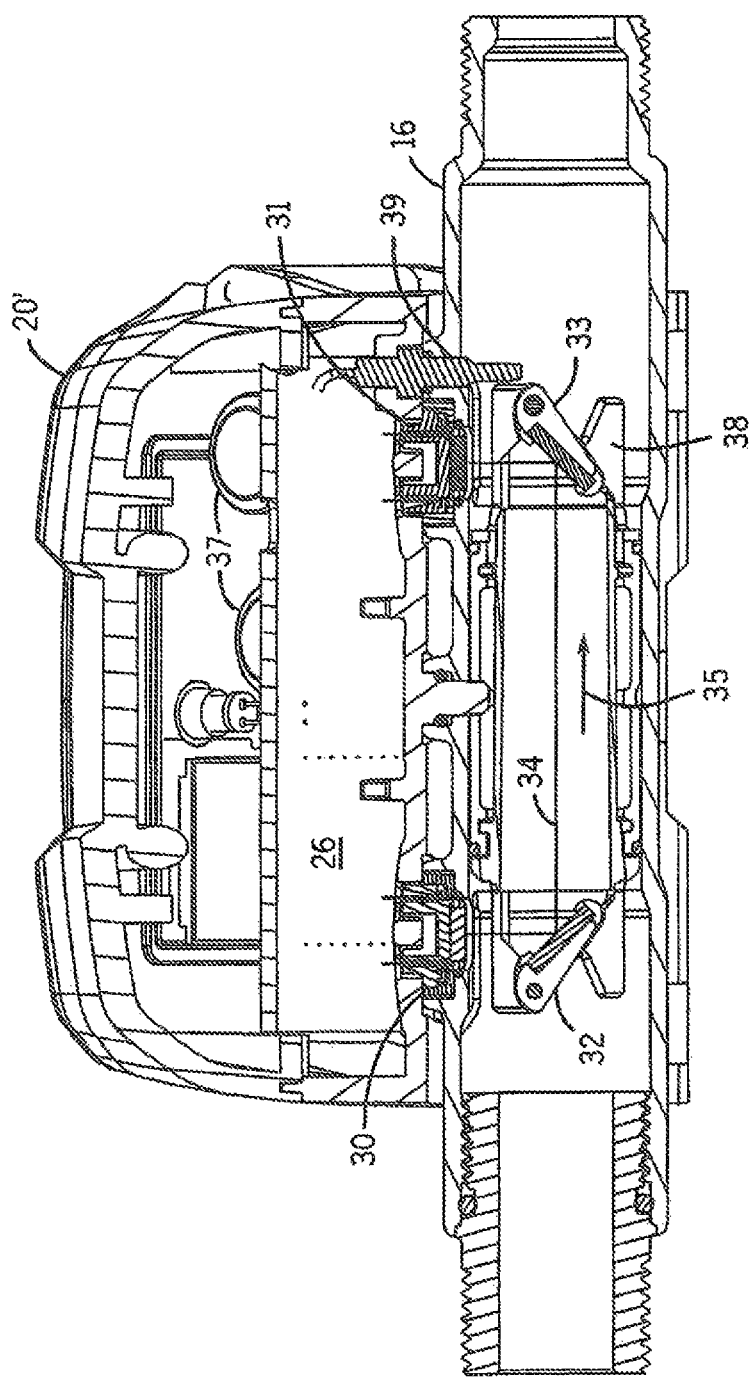
FIG. 5 is a sectional view of the meter assembly of the present invention of FIG. 2.

Referring to FIG. 5, in the integrated meter, meter register and transmitter (FIG. 3 version), the meter housing 16 is made of brass or another suitable material, preferably lead-free, to withstand water pressures. Inside the housing 16 is a plastic metering insert 38 positioned in the conduit 16 and supporting two mirrors 32, 33 at minus forty-five degrees and plus forty-five degrees, respectively, relative to vertical. The assembly also includes two ultrasonic transducers 30, 31, a temperature sensor 39, a signal processing section, 50, and one or more batteries 37. A first ultrasonic signal will be transmitted through one of the transducers 30 downward, to reflect off one of the mirrors 32 at ninety degrees, to travel through the flow stream 35 as an ultrasonic signal parallel to the flow stream and the meter housing 16, which is shaped like a pipe. The signal will then reflect off the second mirror 33 at ninety degrees and be detected by the second ultrasonic transducer 31 and converted to an input to the signal processing section 50 in FIG. 7. A second signal is then transmitted in a reverse direction through second one of the transducers 31, downward to reflect off the second one of the mirrors 33 at ninety degrees to travel through the flow stream 35 opposite the direction of flow 35 and parallel to the direction of flow and the conduit 16. The signal will then reflect off the first-mentioned mirror 32 at ninety degrees and be detected by the first ultrasonic transducer 30 and input to the signal processing section 50 in FIG. 7. A temperature sensor 39 is also positioned with one end projecting into the flow stream 35.

Figure 7:
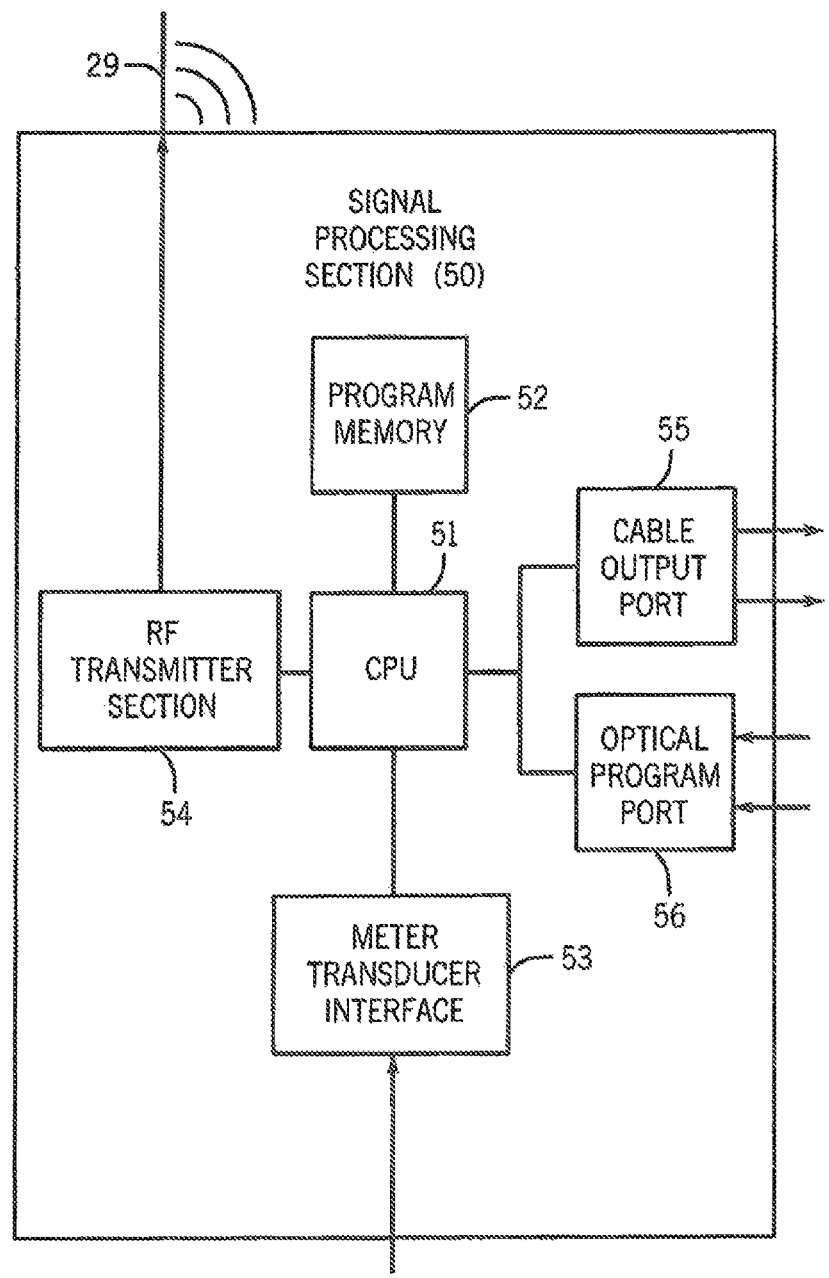
FIG. 7 is a block diagram of a signal processing section within the meter of the present invention of FIG. 4.

Referring to FIG. 7, the housing 20' in FIGS. 3 and 5, encloses an electrical signal processing section 50 typically formed on a circuit board 26 and including a microelectronic CPU 51 operating according to a control program, of program instructions stored in a program memory 52, which may be internal to the CPU 51. The memory 52 is flash memory that can be altered with a special programming unit, which communicates with the transmitter through an optical I/O data port 56, preferably utilizing the IrDa (infrared frequency) protocol. Data profiling data for reverse flow is read through this optical I/O data port 56 as well. This can be stored in a non-volatile memory external to the CPU 51.

Figure 6:
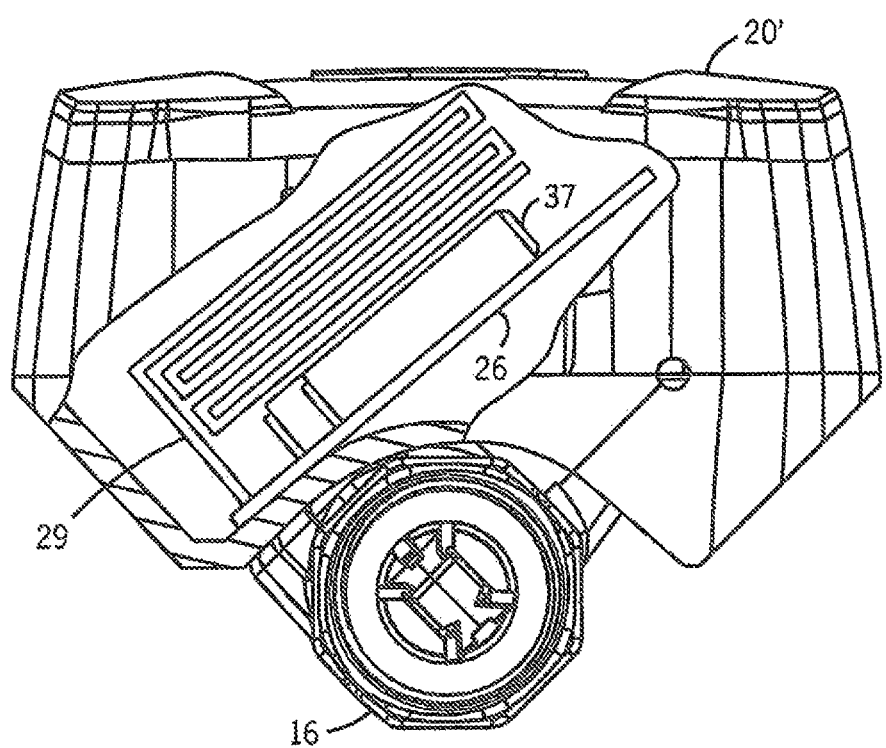
FIG. 6 is an end view of the meter assembly of FIG. 2 with parts of the housing broken away for a view of the interior.

As further seen in FIG. 7, the CPU 51 receives signals from an ultrasonic transducer interface 53. This section 53 can receive the ultrasonic signals 34 after conversion by the transducers 30, 31, to eventually produce data signals at a logic level of power, such as 3.6 dc volts, for digital circuitry. The CPU 51 produces metering data in messages, which are converted to radio frequency (RF) signals by an RF transmitter section 54 that modulates signals for transmission. These signals can then be signaled directly through an antenna 29 (FIGS. 6 and 7) to an RF receiver, represented generally by block 24 in FIG. 3, provided that the pit lid 15 is not made of metal so as to interfere with the radio frequency signals. The message data contained in the RF transmissions is mapped in FIGS. 8-11.

In the embodiments in FIGS. 2 and 4, a meter transducer section (not illustrated) in the meter register housing 20, 20" would transmit data representing units of utility consumption through a cable output port and through the cable 21, to respective transmitter assemblies 10, 10" seen in FIGS. 2 and 4 for conversion to RF signals and transmission to a radio receiver 24 seen in FIG. 1. In these embodiments, the transmitter assemblies 10, 10" would include a signal processing section of a type seen in FIG. 7, including a CPU, a program memory, an RF transmitter section and an antenna to convert the meter data to radio frequency signals according to a message protocol. The information in the radio messages, as transmitted from the transmitter assemblies 10, 10", would be organized as illustrated in FIGS. 8-11.

The radio signals can be transmitted from the AMR transmitter in several modes of operation, in a one-way AMR network. Although the invention is disclosed in one example, in a one-way network, the invention could also be applied in a two-way communication network, where each radio transmitter described herein would be included as one portion of a transceiver. Drive-by vehicles 27 (FIG. 1) will be able to read the transmitter signal and collect meter readings. This type of system uses a battery for power and this mode of transmission provides long battery life using small batteries. This signal may be read by fixed receivers 22 provided they are not too far from the transmitter.

To reach fixed location receivers 22 (FIG. 1), it is desirable to provide a transmission utilizing a higher power level than the prior art low power methods used for communicating with drive-by receivers. In the present invention, this is accomplished by sending out a frequency-hopping spread-spectrum (FHSS) signal over twenty-five channels. Various time periods can be observed in sending out the two messages, and the second message may be sent out less frequently than the first message.

FIGS. 8-11 show the data in the two messages referred to more generally above. The messages contain data for implementing various alarm conditions, including a reverse flow alarm, a potential leak alarm, a stuck meter condition, (no usage for 30 days), a tamper alarm, an empty pipe alarm, a low temperature alarm and an end-of-life notification. The reverse flow alarm, the empty pipe condition and the end-of-life notification are conditions which are particularly related to electronic flow meters. The low temperature condition is a feature of the ultrasonic flow meter that is available, and is sensed with the addition of a temperature sensor 39 to the meter housing assembly 16, 20 as seen in FIG. 4.

Figure 8:
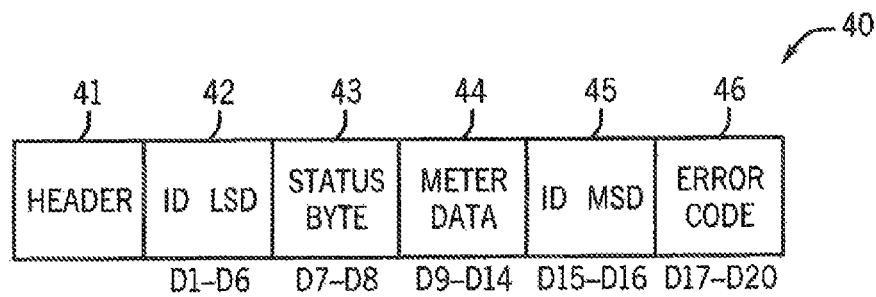
FIGS. 8-9 are data maps of a first message transmitted by the transmitter portion of FIGS. 2-4 to a receiver.

As seen in FIG. 8, the first message 40 includes a header 41 of forty-eight (48) bits, a data field and an error code field in the form of 120 bits comprising twenty (20) hexadecimal digits. The first six hexadecimal digits, D1-D6, provide digits of a transmitter identification number. The next two hexadecimal digits, D7-D8, provide status data 43 seen in more detail in FIG. 9. This is followed by six hexadecimal digits, D9-D14, of meter data representing consumption of the utility by the customer. This is followed by two more hexadecimal digits, D15-D16, providing the most significant digits of a transmitter identification number. This is followed by four more hexadecimal digits, D17-D20, providing an error checking code, preferably a cyclic redundancy code (CRC).

Figure 9:
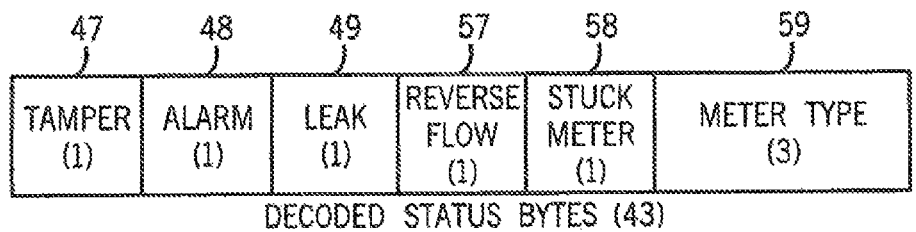

Referring to FIG. 9, the status byte 43 includes status bits indicating presence of alarm data in a following message for the tamper alarm 47, other alarms 48 such as empty pipe, low temperature (3 degrees C. or below) or end-of-life, potential leak alarm 49 (no usage 24 hours), reverse flow alarm 57 or stuck meter (no usage) alarm 58. The last three bits 59 indicate a meter encoder type, such as RTR, ADE or gas, which are types known from the commercial products of the assignee.

Figure 10:
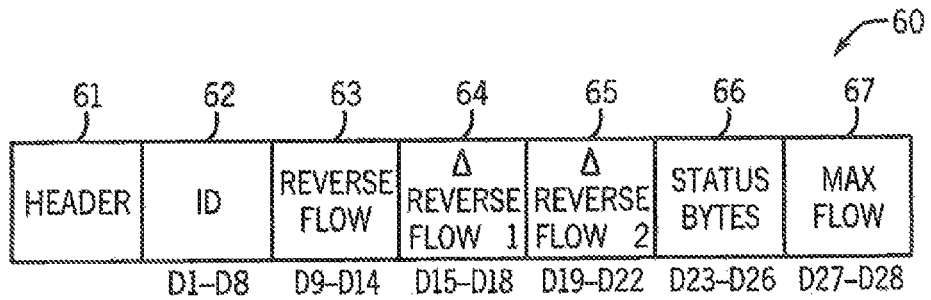
FIGS. 10-11 are data maps of a second message transmitted by the transmitter portion of FIGS. 2-4 to a receiver.

As seen in FIG. 10, the second message 60 also includes a header 61 of forty-eight (48) bits, a data field and an error code field in the form of 136 bits comprising thirty-four (20) four-bit hexadecimal digits. The first eight hexadecimal digits, D1-D8, provide four bytes of a transmitter identification number. The next six hexadecimal digits, D9-D14, provide reverse flow data 63. This is followed by four hexadecimal digits, D15-D18, of "Δ reverse flow" data 64 in the last twenty-four (24) hours. This is followed by four more hexadecimal digits, D19-D22 providing of "Δ reverse flow" data 65 in the last seven (7) days. This is followed by four more four more hexadecimal digits, D23-D26, providing two bytes of status data 66 seen in more detail FIG. 11. This is followed by two more hexadecimal digits, D27-D28, providing data for max flow rate and by four more hexadecimal digits D29-D32 (not shown in FIG. 9) providing an error checking-code, preferably a cyclic redundancy code (CRC).

Figure 11:
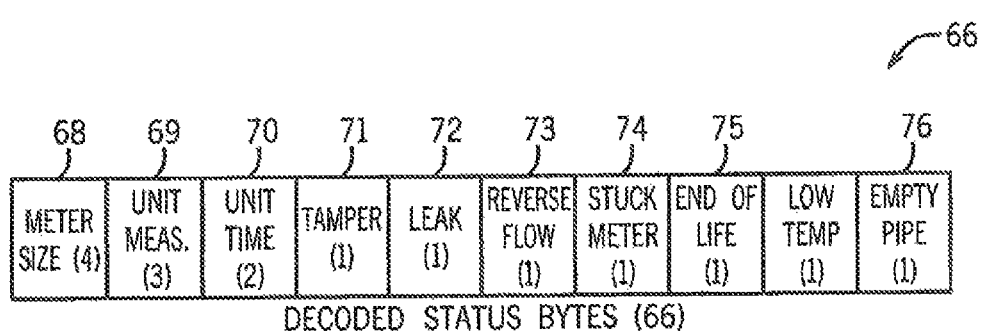

FIG. 11 shows the details of the two status bytes 66 in which meter size is defined by four bits 68, a unit of measure is defined by the next three bits 69, units of time are defined by the next two bits 70, and indicators are provided, for the following alarms: tamper 71, leak 72, reverse flow 73, stuck meter 74 (no usage for 30 days), end-of-life 75 and low temperature 76.

It should noted that the alarm status bits 47-49 and 57-58 in the first message in FIG. 8 indicate the presence of actual alarm data in the second message. It should now be apparent how the first message and second message contribute to increasing the diagnostic data available in the two messages due to the capabilities of an ultrasonic flow meter. This provides advantages in diagnosing operating-conditions, which have not been known before the invention.

This has been a description of the preferred embodiments, but it will be apparent to those of ordinary skill in the art that variations may be made in the details of these specific embodiments without departing from the scope and spirit of the present invention. For example, although the preferred embodiment uses ultrasonic signals to develop a meter reading, it will be apparent that the same messaging can be applied to fluidic oscillator type or electromagnetic type meters and that such variations are intended to be encompassed by the following claims, unless specifically excluded.

We claim:

1. Apparatus for use in transmitting radio messages in an automatic meter reading network, the apparatus comprising:
   a processing circuit for converting meter reading signals into messages, including a first message having utility consumption data and a meter diagnostic status message indicating the presence of alarm data in a second message generated after the first message, the second message having meter reverse flow data and meter diagnostic data including the alarm data providing additional information related to the alarm data in the first message; and
   transmitter circuitry configured for receiving said first message and said second message from the processing circuit, the transmitter circuitry converting said first message and said second message into radio frequency signals and transmitting said radio frequency signals to an external receiver.

2. The apparatus as recited in claim 1, further comprising an electronic flow meter, the apparatus being housed in one housing assembly that can be installed in as pipe.

3. The apparatus as recited in claim 2, wherein the electronic flow meter is more particularly an ultrasonic flow meter, and the assembly further comprises a low temperature sensor disposed in the flow stream and wherein the diagnostic data includes a low temperature event signal.

4. The apparatus as recited in claim 1, further comprising an electronic flow meter and wherein the electronic flow meter and the processing circuit for converting meter reading signals into messages, are housed in a housing assembly that can be installed in a pipe, and wherein the transmitter circuitry is housed in a separate housing.

5. The apparatus as recited in claim 4, wherein the electronic flow meter is more particularly an ultrasonic flow meter, and the assembly further comprises a low temperature sensor disposed in the flow stream and wherein the diagnostic data includes a low temperature event signal.

6. The apparatus of claim 1, wherein the processing circuit and the transmitter circuitry are enclosed in a transmitter housing separate from a meter and a Meter register that provides signals representing units of utility consumption to the transmitter housing.

7. The apparatus as recited in claim 1, wherein the diagnostic data includes at least one of: reverse flow data, empty pipe data and battery life data.

8. The apparatus as recited in claim 1, wherein the diagnostic data includes reverse flow indicating reverse flow conditions over a last seven days and includes data indicating reverse flow conditions over a last twenty-four hours.

9. The apparatus as recited in claim 1, wherein the second message is transmitted less frequently than the first message.

10. The apparatus as recited in claim 1, wherein the first message and the second message are transmitted as frequency-hopping spread-spectrum signals.

11. The apparatus as recited in claim 1, wherein the first message and the message are transmitted by circuitry comprising a single transmitter.

12. The apparatus as recited in claim 1, further comprising an optical data port communicating with circuitry for converting meter reading signals, the optical data port providing access to an external device for reading reverse flow profiling data for a defined time period from the processing circuit.

13. A method of transmitting radio frequency signals representing utility metering data, the method comprising:
   converting meter reading signals from a flow sensing device into messages, said messages including a first message having utility consumption data and a meter diagnostic status message indicating the presence of alarm data in a second message generated after the first message, the second message having meter reverse flow data and meter diagnostic data including the alarm data providing additional information related to the alarm data in the first message; and
   receiving said first message and said second message and converting first message and said second message to radio frequency signals and transmitting said radio frequency signals to a receiver.

14. The method as recited in claim 13, wherein the electronic flow meter is more particularly an ultrasonic flow meter and the method further comprising sensing temperature in the flow stream and wherein the diagnostic data includes a low temperature event signal.

15. The method as recited in claim 13, wherein the diagnostic data includes at least one of reverse flow data, empty pipe data and battery life data.

16. The method as recited in claim 13, wherein the radio signals carrying the second message are transmitted less frequently than the radio signals carrying the first message to conserve power consumption in the utility meter interface device.

17. The method as recited in claim 13, wherein the second message is transmitted less frequently than the first message.

18. The method as recited in claim 13, wherein the meter reverse flow data includes data indicating reverse flow conditions over a last seven days and includes data indicating reverse flow conditions over a last twenty-four hours.

* * * * *